United States Patent Office 3,707,360
Patented Dec. 26, 1972

3,707,360
SMOKE SUPPRESSANT FUEL COMPOSITION
George W. Eckert, Wappingers Falls, N.Y., assignor to Texaco Inc., New York, N.Y.
No Drawing. Filed Dec. 7, 1970, Ser. No. 95,937
Int. Cl. C10l 1/18, 1/22, 1/32
U.S. Cl. 44—51
7 Claims

ABSTRACT OF THE DISCLOSURE

Smoke inhibited middle distillate fuel composition comprising a hydrocarbon distillate fuel in the kerosene boiling range containing an additive combination comprising:
(1) a calcium carbonate overbased calcium sulfonate,
(2) a calcium hydroxide overbased calcium sulfonate and
(3) a nitropropane.

BACKGROUND OF THE INVENTION

Field of the invention

Diesel and turbine or jet engines which burn a hydrocarbon middle distillate fuel in the kerosene boiling range tend to discharge substantial quantities of smoke in their exhaust gases under certain conditions. This exhaust pollution is highly undesirable and is of such concern that the operation of diesel and turbine powered vehicles has come under strict regulation in many places with regard to when and where they can be operated.

For some time, smoke suppressants have been employed in or added to diesel fuels particularly when the engines are being operated in areas of high population density. The most common smoke suppressants commercially employed are certain basic compounds of barium. A barium carbonate overbased barium sulfonate is effective for substantially reducing the amount of smoke exhaust from a diesel engine. There are, however, serious questions concerning the use of barium compounds as smoke suppressants. Many of the common barium compounds are poisonous to human beings. The use of barium compounds in diesel fuels and the discharge thereof in the exhaust gases of the diesel engine after the fuel has been burned in the combustion zone possibly changing the chemical nature of the barium smoke suppressant to a more toxic material is considered by some to be introducing a serious health hazard to the atmosphere.

Calcium compounds, particularly calcium carbonate overbased calcium sulfonate have been proposed to replace the barium smoke suppressants in these fuel compositions. The calcium compounds have not enjoyed any particular degree of commercial success. A serious problem with some of the calcium sulfonate smoke suppressants is that they cause plugging of the fuel injectors in the engine after a short period of operation rendering the engines inoperative.

Description of the prior art

A copending application Ser. No. 770,781 filed on Oct. 25, 1968, now U.S. 3,539,312, is directed to a smoke suppressant fuel composition for diesel and turbine engines containing calcium sulfonate in combination with calcium hydroxide or a calcium alcoholate.

SUMMARY OF THE INVENTION

The novel fuel composition of this invention comprises a middle distillate fuel oil composition boiling in the range of 300 to 650 degrees F. containing a smoke suppressing amount of a three component additive. More specifically, the fuel composition of the invention contains a calcium carbonate overbased calcium sulfonate, a calcium hydroxide overbased calcium sulfonate and a nitropropane. An important feature of this fuel composition is that it gives a substantial reduction in smoke emission without adding materials of a toxic nature to the exhaust and without causing any substantial loss in engine horsepower due to the use of the additive. Another important feature of the invention is that the fuel composition retains its smoke suppressing properties for extended periods of engine operation.

The composition of the additive combination employed in the fuel of the invention is critical. The calcium carbonate overbased calcium sulfonate and calcium hydroxide overbased calcium sulfonate are not entirely satisfactory as smoke suppressants when employed either singly or in combination. Nitropropane has no smoke suppressing properties of its own. When these three components are employed together in suitable amounts, they are surprisingly and unexpectedly effective for providing a smoke suppressant fuel composition which is operative for extended periods of engine operation.

The calcium sulfonates employed to prepare additive components for this invention can be derived from a petroleum sulfonate or from a synthetic sulfonate, such as didodecylbenzene sulfonate. Petroleum sulfonic acid is generally produced by treating a suitable petroleum hydrocarbon fraction with sulfuric acid according to well-known methods. For example, a petroleum base oil is gradually treated with incremental amounts of fuming sulfuric acid. After the desired amount of sulfuric acid has been added to the oil to effect a reaction, the sludge which forms is removed and the acid-treated oil containing dissolved sulfonic acid is neutralized with a solution of sodium hydroxide. The aqueous alkalized solution is removed from the mixture and the sodium salt of petroleum sulfonic acid extracted with alcohol. The alcohol is then separated from the extracted layer by distillation or other suitable means. The sodium petroleum sulfonate is converted to calcium petroleum sulfonate by treating with calculated amounts of a calcium compound, such as calcium chloride. Alternatively, the calcium sulfonate can be made by the neutralization of the sulfonic acid with calcium hydroxide.

Calcium carbonate overbased calcium sulfonate is prepared by reacting a sulfonic acid or sulfonate salt with a stoichiometrical excess of calcium carbonate to form the overbased compound. In general, the calcium carbonate overbased calcium sulfonate contains from about 10 to 18 percent calcium and has a Total Base No. ranging from about 250 to 450 and preferably from about 300 to 400. The Total Base No. is defined as the total alkalinity expressed as milligrams of KOH per gram of material. The calcium carbonate overbased calcium sulfonate is employed in the fuel composition in a concentration ranging from about 0.005 to 0.2 weight percent calcium calculated on the calcium metal basis.

Similarly, calcium hydroxide overbased calcium sulfonate is prepared by reacting a sulfonic acid or sulfonate salt with a stoichiometrical excess of calcium hydroxide to form the overbased compound. This calcium hydroxide overbased calcium sulfonate contains from about 1.8 to 7.0 percent calcium and has a Total Base No. ranging from about 5 to 100 and preferably from about 6 to 25. Calcium hydroxide overbased calcium sulfonate is employed in the fuel composition in a concentration ranging from about 0.001 to about 0.2 weight percent of calcium calculated on the calcium metal basis.

The nitro compound of the additive mixture is a nitro derivative of a $C_2$ to $C_4$ alkane. Specific examples include 2-nitropropane, 1-nitropropane, a nitrobutane, nitroethane or a mixture of these compounds. In general, the nitropropane compound is employed in the fuel composition at a concentration ranging from about 0.01 to 0.25 volume percent. The following examples illustrate the preparation of specific additive compounds employed in the invention.

EXAMPLE I

Calcium carbonate overbased calcium sulfonate

An oil-soluble sulfonic acid obtained from the treatment of petroleum with sulfuric acid was dissolved in a paraffinic mineral oil having an SUS of 100 at 100° F. and was reacted with calcium hydroxide to form a calcium sulfonate. The calcium sulfonate in the presence of calcium hydroxide and a low molecular weight alcohol was blown with $CO_2$ to form an overbased product. Following this reaction, the product was filtered and stripped of alcohol and water by heating to about 350° F. The calcium carbonate overbased calcium sulfonate having a Total Base No. of about 350 was recovered as a concentrate in mineral oil.

EXAMPLE II

Calcium hydroxide overbased calcium sulfonate

A petroleum sulfonic acid was dissolved in a mineral oil and reacted with calcium alcoholate to form a calcium sulfonate. The product was hydrolyzed and then stripped of alcohol and water by heating to about 350° F. A calcium hydroxide overbased calcium sulfonate having a Total Base No. of 12 was recovered as a concentrate in mineral oil.

The effectiveness of the smoke suppressant fuel composition of the invention was determined in a series of tests including a Haze Test, a Filterability Test and a Petter Engine Test described below.

HAZE AND FILTERABILITY TEST

(A) Haze test

This test is conducted to determine whether an additive containing fuel becomes cloudy over water. The procedure involves adding 450 cc. of the fuel to 10 cc. of the distilled water in a 16 oz. clear bottle. This sample is then stored for three weeks at room temperature. Any haze or cloudiness in the sample indicates that water has been taken into the fuel and makes the fuel composition unacceptable.

(B) Filterability test

Following the above described Haze Test the same sample is used in a filterability test to determine if the fuel would plug the fuel line filters. Filter plugging by a fuel is caused by an increase in the size of the colloidal calcium additive particles in the fuel due to the absorption of water. In this test, the fuel flows by gravity through a 10 micron filter. The time of flow in minutes for 400 cc. of fuel to pass through the filter is measured. A time equal to or less than that for the base fuel is required for a fuel composition to pass this test. A fuel that plugs the filter so that the flow of fuel is substantially reduced or stopped is unsatisfactory.

PETTER ENGINE TEST

This engine test is run on a single cylinder four cycle open combustion chamber Petter AV-1 Series II Diesel engine. The test procedure involves operating the engine on the test fuel at a set load (18.0 lbs. scale reading) for three hours. The engine is stopped if the smoke value for the additive-containing fuel becomes as high as that for the base fuel reference.

Excessive deposits formed on the injector during the run will cause the smoke value to go up.

A smoke meter of the light extinction type is employed to measure the exhaust smoke from the fuel being tested. A beam of light is passed through the path of the smoke in an exhaust tube. The light that passes through hits a photoelectric cell where it is converted into an electric current which is then measured by a microammeter on a scale reading from 0 to 100. A "0" reading indicates no smoke in the exhaust and 100 indicates total light extinction because of smoke. The base fuel at 1000 r.p.m. and 18.0 lbs. scale load generally gives a scale reading of 11 to 14 on the microammeter scale.

The base fuel employed in the test was a middle distillate diesel fuel having the following properties and inspection values:

Gravity ° API _____ 35.9
Sulfur, percent _____ 0.12
ASTM distillation:
  IBP _____ 384
  10% _____ 446
  50% _____ 514
  90% _____ 586
  E.P. _____ 629

The test results are set forth in Table I below.

TABLE I.—CALCIUM ADDITIVES TESTED AS SINGLE ADDITIVE IN DIESEL FUEL

| Run | Calcium carbonate overbased calcium sulfonate | Concent. wt percent Ca | Ca(OH)₂ overbased Ca sulfonate | Concent. wt. percent Ca | 2-nitropropane, vol. percent | Haze test | Filterability test, min./400 cc. | Smoke values Base fuel | Test fuel Start | Test fuel End | Time, min. |
|---|---|---|---|---|---|---|---|---|---|---|---|
| 1 | CaCO₃-calcium sulfonate* TBN300 | 0.05 | | | | Clear | 170 | 13 | 5 | 11 | 90 |
| 2 | CaCO₃-calcium sulfonate* TBN400 | 0.05 | | | | do | 110 | 13 | 8 | 15 | 90 |
| 3 | | | Example II | 0.05 | | Cloudy | 56 | 14 | 8 | 14 | 180 |
| 4 | | | Ca(OH)₂Ca sulfonate* TBN92. | 0.05 | | do | Plugged | 14 | 10 | 26 | 80 |
| 5 | CaCO₃-calcium sulfonate* TBN400 | 0.05 | | | 0.2 | Hazy | | 15 | 8 | 20 | 180 |
| 6 | CaCO₃-calcium sulfonate* TBN300 | 0.05 | | | 0.2 | Clear | | 12 | 5 | 17 | 150 |
| 7 | do | 0.04 | | | 0.05 | Hazy | | 15 | 11 | 15 | 90 |
| 8 | do | 0.04 | Example II | 0.02 | | do | | 22 | 12 | 25 | 60 |
| 9 | do | 0.03 | do | 0.02 | | Cloudy | 115 | 14 | 10 | 14 | 180 |
| 10 | do | 0.03 | do | 0.015 | 0.10 | Clear | | 11 | 3 | 5 | 180 |
| 11 | do | 0.03 | do | 0.015 | 0.05 | do | 70 | 11 | 7 | 5 | 180 |
| 12 | do | 0.02 | do | 0.012 | 0.10 | do | 56 | 11 | 6 | 4 | 180 |

*Commercial product.

Runs 10 to 12 in Table I illustrate the fuel composition of the invention containing the three-component additive combustion of a calcium carbonate overbased calcium sulfonate, a calcium hydroxide overbased calcium sulfonate and a nitropropane. These fuel compositions were clear in the Haze Test, were readily filterable as shown in the Filterability Test and very substantially suppressed smoke in the Petter Engine Test both at the start of this test and throughout to the end of the test. Runs 1 through 9 inclusive were unsatisfactory in either the Haze Test, the Filterability Test or in failing to obtain or maintain low smoke values throughout the Petter Engine Smoke test.

We claim:
1. A liquid fuel composition comprising a mixture of hydrocarbons boiling in the range from about 300 to 650 degrees F. containing from about 0.005 to 0.2 weight percent calcium metal based on calcium carbonate over- based calcium sulfonate having a Total Base Number from 250 to 450 and from about 0.001 to 0.2 weight percent calcium metal based on calcium hydroxide overbased calcium sulfonate having a Total Base Number from 5 to 100 and from about 0.01 to 0.25 volume percent of a $C_2$ to $C_4$ nitroalkane.

2. A fuel composition according to claim 1 in which said calcium carbonate overbased calcium sulfonate has a Total Base Number ranging from about 300 to 400.

3. A fuel composition according to claim 1 in which said calcium hydroxide overbased calcium sulfonate has a Total Base Number ranging from about 6 to 25.

4. A fuel composition according to claim 1 in which said nitroalkane is 1-nitropropane.

5. A fuel composition according to claim 1 in which said calcium carbonate overbased calcium sulfonate has a Total Base Number of about 350.

6. A fuel composition according to claim 1 in which said calcium hydroxide overbased calcium sulfonate has a Total Base Number of about 12.

7. A fuel composition according to claim 1 in which said nitroalkane is 2-nitropropane.

References Cited
UNITED STATES PATENTS

| | | | |
|---|---|---|---|
| 1,820,983 | 9/1931 | Loomis | 44—57 |
| 3,437,465 | 4/1969 | LeSuer | 44—51 |
| 3,539,312 | 11/1970 | Eckert et al. | 44—76 |

DANIEL E. WYMAN, Primary Examiner

W. J. SHINE, Assistant Examiner

U.S. Cl. X.R.

44—72, 76